(12) United States Patent
Cline

(10) Patent No.: US 7,241,385 B1
(45) Date of Patent: Jul. 10, 2007

(54) OIL FILTER CANISTER REMOVAL TOOL

(76) Inventor: Daniel B. Cline, 955 Maple Cover Rd., Leonard, MI (US) 48367

( * ) Notice: Subject to any disclaimer, the term of this patent is extended or adjusted under 35 U.S.C. 154(b) by 9 days.

(21) Appl. No.: 11/348,646

(22) Filed: Feb. 7, 2006

(51) Int. Cl.
*B01D 27/08* (2006.01)
*B25B 13/06* (2006.01)

(52) U.S. Cl. ............. 210/232; 210/248; 81/121.1; 81/120; 81/3.08; 81/64

(58) Field of Classification Search ............ 210/248, 210/232; 81/121.1, 120, 3.08, 64
See application file for complete search history.

(56) References Cited

U.S. PATENT DOCUMENTS

| | | | | |
|---|---|---|---|---|
| 3,710,930 A | * | 1/1973 | Owdom | 206/216 |
| 4,266,452 A | * | 5/1981 | Crist | 81/124.7 |
| 4,865,727 A | * | 9/1989 | Krauss | 210/168 |
| 4,867,017 A | * | 9/1989 | Holman | 81/121.1 |
| 5,271,299 A | * | 12/1993 | Wadsworth | 81/121.1 |
| 5,421,223 A | * | 6/1995 | Wawrzyniak | 81/121.1 |
| 5,981,649 A | * | 11/1999 | Hiraoka et al. | 524/525 |

* cited by examiner

*Primary Examiner*—Thomas M. Lithgow
(74) *Attorney, Agent, or Firm*—Young & Basile, P.C.

(57) ABSTRACT

An oil filter canister removal tool comprising a cup-shaped plastic body long enough to receive the filter therein and of sufficient diameter as to provide radial clearance between the filter canister and the top rim of the body. A snug fit can be provided by integral flutes or bonded in strips of elastomeric material. In operation the tool is slipped over a canister after the canister has been loosened relative to the engine block. The tool is manually rotated until the canister is free of the engine. The tool can be cleaned up and reused after disposal of the oil filter canister. The tool may also be thrown away with the used filter.

3 Claims, 2 Drawing Sheets

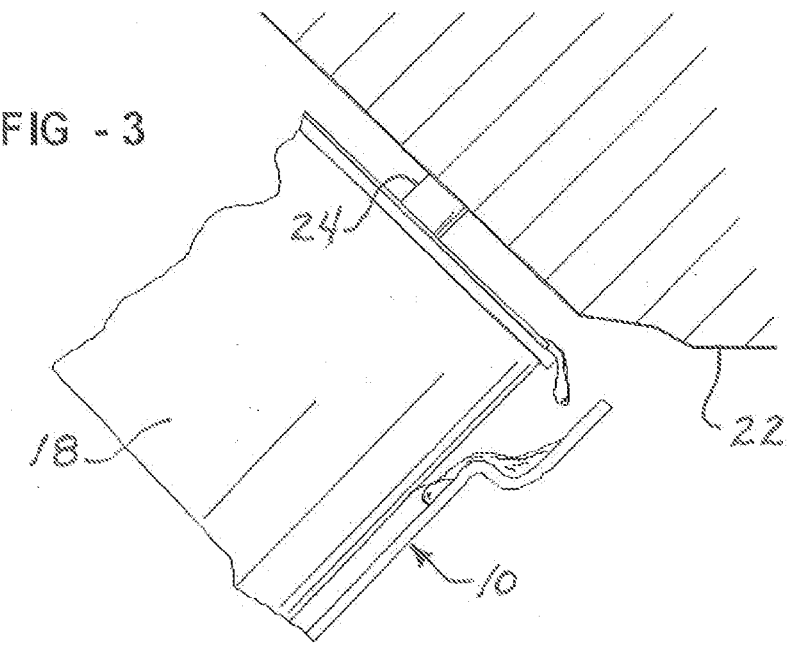
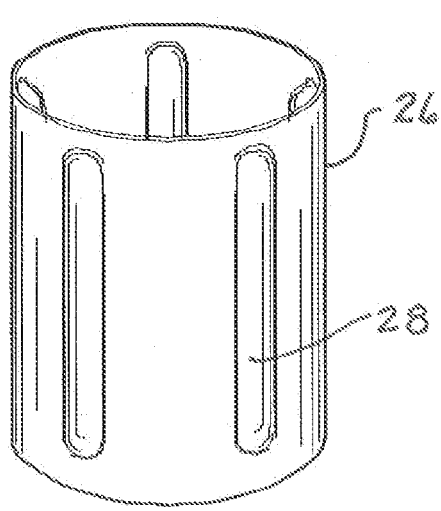
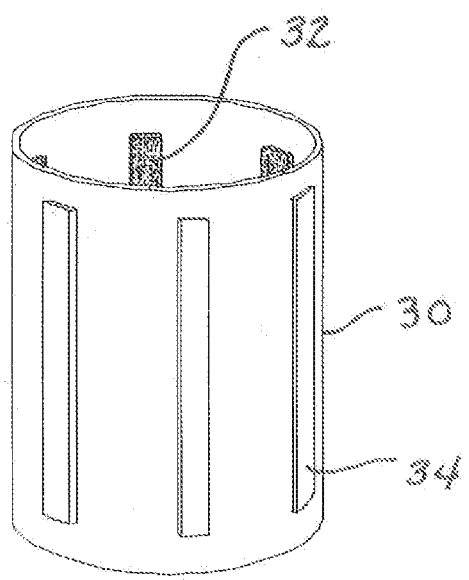

OIL FILTER CANISTER REMOVAL TOOL

FIELD OF THE INVENTION

My invention relates to oil filter canister removal tools and more particularly to a cup-shaped tool which is effective to prevent the dripping of oil during a filter canister removal operation.

BACKGROUND OF THE INVENTION

I have found that it is common for a small quantity of dirty oil to drip from an oil filter canister during the process of removing the used oil filter canister from the threaded connection with an engine block. The dirty oil typically drips onto a garage floor or, in the case of a marine engine, into the bilge of the boat where space constraints make clean up operations particularly difficult.

SUMMARY OF THE INVENTION

My invention is a simple inexpensive removal tool for oil filter canisters which is effective in preventing the dripping of dirty oil from the filter canister during the removal process. In general my invention comprises a cup-shaped tool which fits over the oil filter canister, is of sufficient length to fully receive and enclose the oil filter canister, and is of sufficient diameter to create a clearance between the oil filter canister and the open top rim of the tool so that oil dripping from the oil filter canister during the removing operation falls into the tool rather than onto the floor or into the bilge of a boat. I provide a snug fit between my tool and the oil filter canister so that rotation of the tool rotates the oil filter canister to complete the removal operation once it has been loosened using a conventional oil filter wrench. The snug fit can be provided in a number of ways including (a) molding integral inwardly projecting ribs or flutes into the body of the cup-shaped tool, or (b) placing strips of elastomeric material in circumferentially spaced relationship along the inner surface of the tool body. Using these or other similar techniques the radial clearance between the tool body and the filter canister is maintained for the purpose of catching oil while, at the same time, a snug fit between the body and the oil filter canister is provided so that the oil filter canister is easily rotated for removal purposes.

BRIEF DESCRIPTION OF THE DRAWINGS

FIG. 3 is a side view partly in section of the tool of FIG. 1 in association with an oil filter canister during a removal process.

FIG. 4 is a perspective view of a first alternative embodiment of my invention.

FIG. 5 is a perspective view of a second alternative embodiment of my invention.

DETAILED DESCRIPTION OF THE ILLUSTRATIVE EMBODIMENTS

Figure 1:
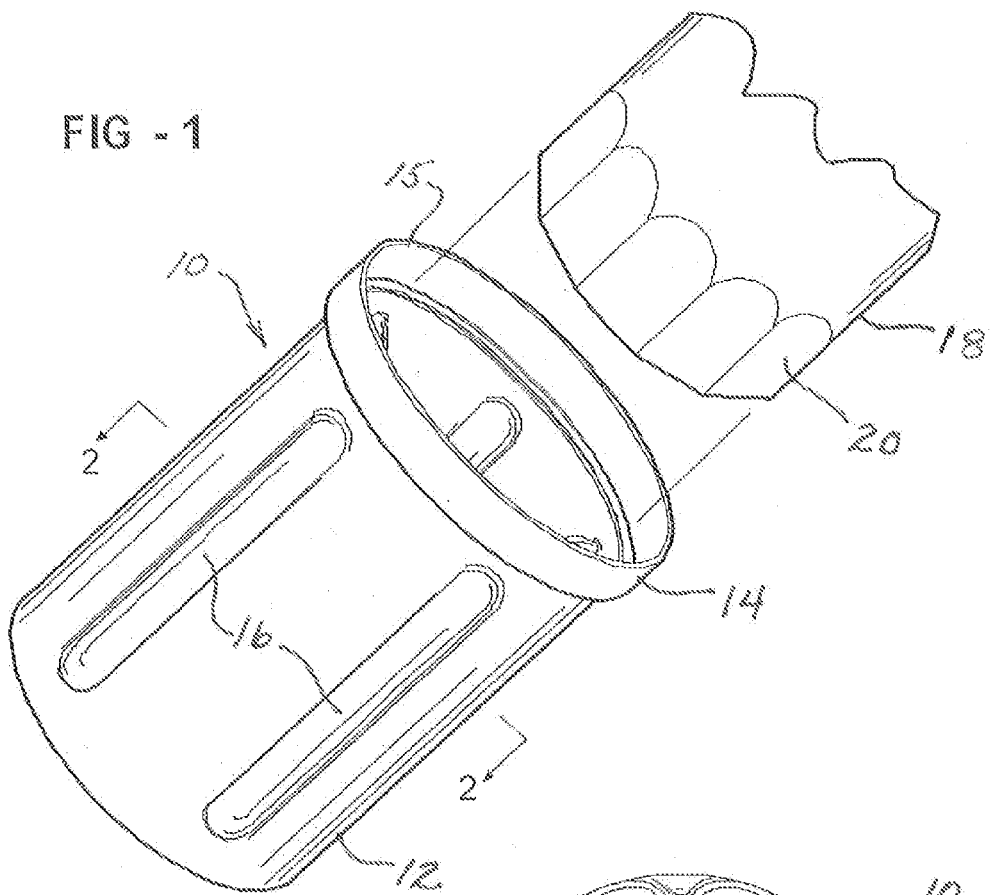
FIG. 1 is a perspective view of an oil filter canister removal tool according to the invention showing the relative size relationship between the tool and a typical oil filter canister.
Figure 2:
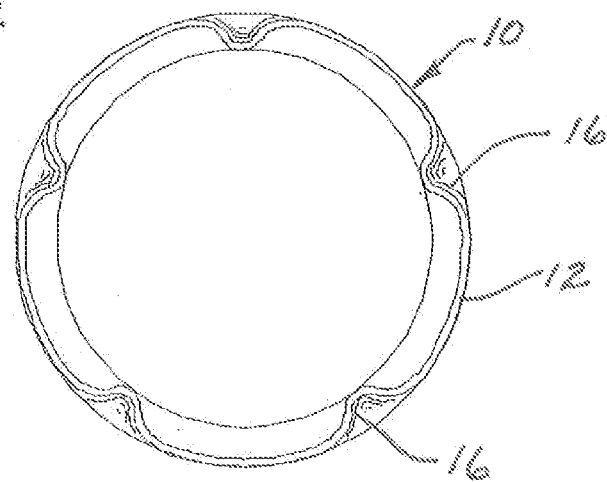
FIG. 2 is a sectional view through the tool of FIG. 1 along the section line 2—2.

Referring now to FIGS. 1–3, a drip-catching removal tool 10 for an oil filter canister 18 is shown to comprise a cup-shaped body 12 having an enlarged diameter band portion 14 near the top rim 15 as well as a plurality of longitudinally extending, circumferentially spaced, inwardly projecting ribs or flutes 16 formed therein. The body 12, in combination with the rim band 14, is of sufficient length so as to fully receive and enclose the body of a conventional oil filter canister 18. The diameter of the body 12, except for the inwardly projecting flutes 16, is of sufficient diameter so as to create a radial clearance or gap between the filter canister 18 and the inner surface of the body 12. The band 14 is stepped out from the body 12 approximately ⅛ to 3/16 of an inch to create additional clearance for the catching of oil drips as best shown in FIG. 3. The flutes or ribs 16 project inwardly by a sufficient amount to fit snugly against the body of the oil filter canister 18 so that rotation of the tool 10, once the filter canister 18 has been loosened relative to the engine block 22, can be easily effected relative to the threaded stud 24 until the canister 18 can be fully separated from the engine block 22.

The oil filter canister 18 is typically cylindrical in shape and may or may not have facets 20 adjacent the outer end to receive an oil filter wrench.

As shown in FIG. 3, I have found that the tool 10 is very effective in catching oil drips which inevitably flow from a used oil filter canister 18 during the removal operation. This is due in part to the fact that oil filters are mounted on engine blocks such as block 22 at an angle and also due in part to the fact that the oil filter canister is full of used oil at the time the removal process is performed.

I prefer to make my tool 10 out of plastic and I have found that a suitable plastic is one of the EPDM elastomers because it is commonly available and relatively soft such that the ribs or flutes 16 provide a good grip on the outer surface of the oil filter canister 18.

After a removal operation, it is a simple matter of removing the filter canister 18 from the tool 10 and cleaning up the tool with a rag or with soap and water or gasoline as desired. The tool 10 can be used many times.

In FIG. 4 I show a first alternative embodiment of my tool in which the plastic body 26 is cup-shaped and provided with internal ribs or flutes 28. In this illustration there are five such flutes 28 in uniformly circumferentially spaced relationship to one another. There is no structure corresponding to the band 14 of the tool 10; instead, I rely on the radial gap or clearance between the body 26 and an oil filter canister such as 18 which fits into the tool body.

In FIG. 5 I show a still further embodiment of my invention comprising a cup-shaped body 30 made of plastic and, like the embodiment of FIG. 4, of sufficient length and diameter as to fully receive and enclose an oil filter canister while allowing a radial clearance between the body 30 and the outer diameter of an oil filter canister. In the embodiment of FIG. 5, I adhesively bond a number of longitudinally extending strips 32 of rubber or EPDM material so as to close the clearance at circumferentially spaced locations and provide a snug fit between the body 30 and an oil filter canister such as 18. I also mold a number longitudinally extending integral plastic strips 34 into the outside surface of the body 30 for gripping purposes. These features 34 are optional.

In all of the embodiments, the choice of material is optional and may include metal as well as various plastics. In the embodiment of FIG. 5, it is less important that the plastic or metal of the body 30 have a high co-efficient to friction as the adhesively bonded in strips 32 provide the function of gripping between the body 30 and the oil filter canister. In the other embodiment, while harder plastics are satisfactory, improved operation can be provided through the use of an EPDM plastic which is softer and provides a higher co-efficient of friction when contacting the outer body of the filter canister 18.

The operation of the embodiments of FIGS. 4 and 5 is similar to the operation of the embodiment of FIGS. 1–3; i.e., the tool body is slipped over the outer surface of the oil filter canister after the canister has been loosened slightly relative to the engine block so it can be turned by hand. Thereafter, the tool body is rotated manually until the filter canister separates from the engine block. The filter canister is thereafter removed from the tool. The tool can be cleaned up for future use and oil drips onto the floor of a garage or into the bilge of a boat have been conveniently and effectively avoided. A cap may be provided for the tool to, fully enclose a filter after removal and to prevent spillage of trapped oil.

What is claimed is:

1. A universal removal tool for engine oil filter canisters comprising:

a substantially cup-shaped body of molded plastic having a bottom and cylindrical wall of a given diameter and of sufficient length so as to substantially fully receive an oil filter canister therein, and circular top rim of greater diameter than the diameter of the cylindrical wall to create a radial clearance between the tool and the canister when the tool is disposed over the canister; and a plurality of inwardly projecting, circumferentially spaced, longitudinal flutes formed on the inside surface of the cylindrical wall between the top rim and the bottom to create snug contact between the body and an oil filter canister inside of said body and an exact corresponding number of spaced, longitudinal concavities on the outside surface of said wall at the exact same locations on the cylindrical wall as the spaced, longitudinal flutes on the inside surface of the cylindrical wall except on the outside surface.

2. A tool as defined in claim 1 wherein the plastic is an EPDM.

3. A universal drip-catching removal tool for an engine oil filter canister comprising:

a substantially cup-shaped body having a cylindrical wall of a diameter large enough to receive an engine oil filter canister therein with a radial clearance between the canister and the body and an integral band defining a top rim of the body having a greater diameter than the diameter of the cylindrical wall, the cup-shaped body being of sufficient axial length to fully receive and enclose an oil filter canister therein; and a plurality of inwardly projecting, circumferentially spaced, longitudinal flutes formed on the inside surface of the cylindrical wall to create snug contact between the body and an oil filter canister inside of said body, and an exact corresponding number of spaced, longitudinal concavities on the outside surface of said wall at the exact same locations on the cylindrical wall as the spaced, longitudinal flutes on the inside surface of the cylindrical wall except on the outside surface.

\* \* \* \* \*